Sept. 4, 1928.
N. C. BREMER
1,682,829
OILING DEVICE FOR DRIVE CHAINS
Filed July 13, 1926
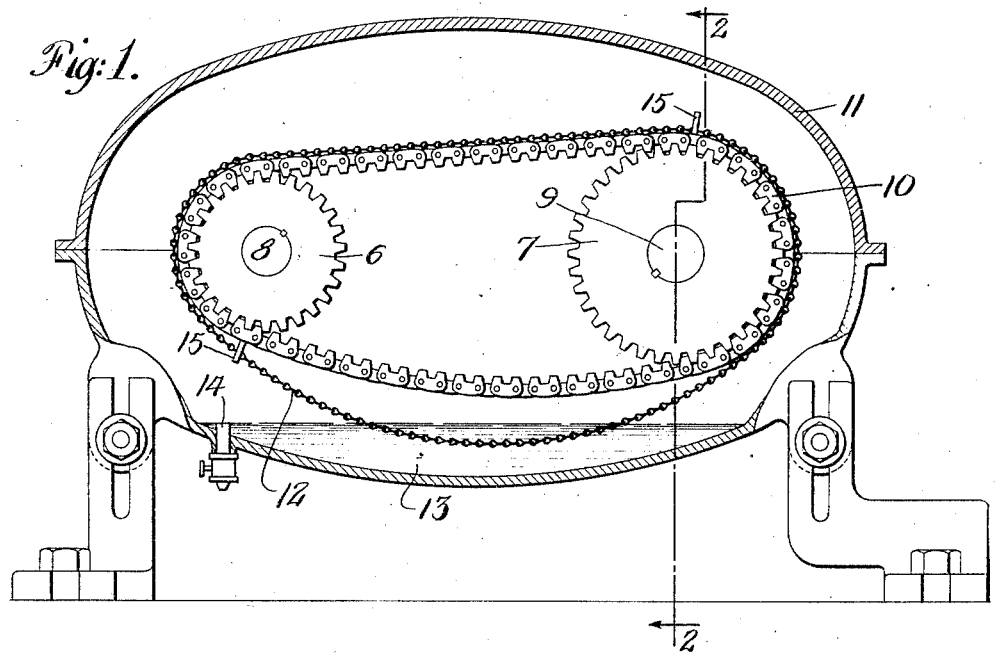
Fig:1.
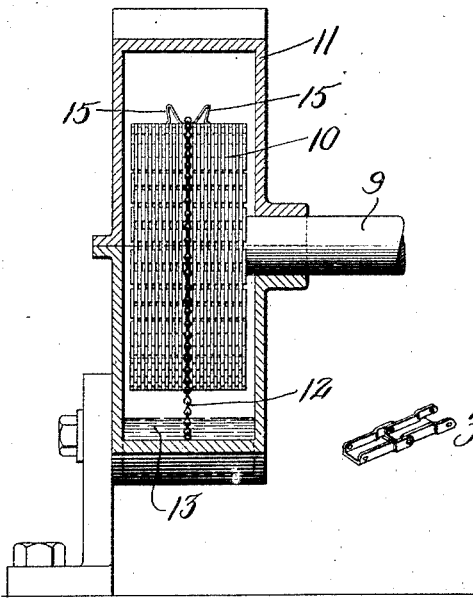
Fig:2.
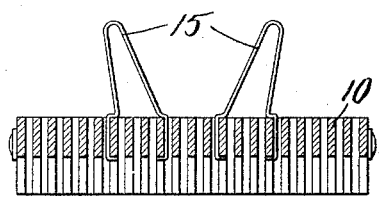
Fig:3.
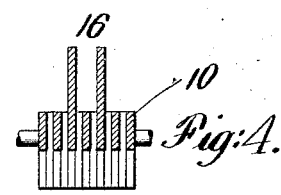
Fig:4.
Fig:5.
INVENTOR
Norman C. Bremer
BY
Synnestvedt & Lechner
ATTORNEYS Patented Sept. 4, 1928.

1,682,829

UNITED STATES PATENT OFFICE.

NORMAN C. BREMER, OF ITHACA, NEW YORK, ASSIGNOR TO MORSE CHAIN COMPANY, OF ITHACA, NEW YORK, A CORPORATION OF NEW YORK.

OILING DEVICE FOR DRIVE CHAINS.

Application filed July 13, 1926. Serial No. 122,072.

This invention relates to oiling devices for chain drives, and is particularly useful in connection with multiplate or silent chain drives.

One of the primary objects of my invention is the provision of simple, inexpensive, and effective means for lubricating drive chains.

Another object of the invention is the provision of means for lubricating drive chains of the multiplate type, whereby the chain, when running, is kept properly lubricated.

Still another object of the invention is the provision of a chain lubricating device in which the chain is supplied with lubricant in a manner to prevent flashing of the lubricant.

How the foregoing, together with such other objects and advantages as may hereinafter appear, or are incident to my invention, are realized is illustrated in preferred form in the accompanying drawings, wherein:

Fig. 1 is an elevational view of a chain drive showing a casing therefor in partial section.

Fig. 2 is a cross section taken substantially on the line 2—2 of Fig. 1, the chain and sprocket shaft, however, appearing in elevation.

Fig. 3 is an enlarged cross section through the upper run of the chain.

Fig. 4 is an enlarged fragmentary cross section through a chain of modified construction, and Fig. 5 is an enlarged detail view of a modification.

Referring to Figs. 1 and 2 of the drawings, it will be seen that I have therein illustrated a very simple form of chain drive comprising a pair of sprocket wheels 6 and 7 mounted on the shafts 8 and 9, respectively, over which a chain 10 passes. In this instance, the chain 10 is shown of the "silent type" in which the links are composed of a plurality of interspersed plates adapted to arch over the teeth of the sprockets, and suitable pintles for connecting the links together. A casing or housing 11 is provided for the chain drive.

The oiling device 12 for the chain 10 consists of a light endless chain or belt loosely passing around the drive chain, and a lubricant reservoir 13 which is preferably made integral with the casing 11.

It will be seen that the length of chain employed in the endless oiling chain 12 is longer than the length employed in the drive chain, whereby the sag of the slack run of the oiling chain is greater than the sag in the slack run of the drive chain 10. Therefore, it will be observed that by maintaining the level of the lubricant in the reservoir 13 somewhere between the slack runs of the two chains, the oiling chain 12 will pass through the lubricant and carry lubricant therewith to the upper run of the drive chain, and that the drive chain does not pass through the lubricant contained in the reservoir, thus eliminating any danger of the oil flashing, due to friction caused by the multiple plate links passing therethrough. By this novel means the chain, when running, is kept well supplied with a proper amount of lubricant.

One convenient method of telling when sufficient lubricant has been supplied to the reservoir is to provide an overflow pipe 14 which may be valve controlled. The lower level of the lubricant may also be gauged by a similar valve controlled outlet.

In order to prevent displacement of the oiler chain 12, I have provided guiding means therefor which, as shown in Figs. 1 to 3, inclusive, comprises the clip-like members 15, 15, carried by the drive chain 10, and provided at suitably spaced intervals along the chain. These clips form a V-shaped groove for positioning the oiling chain 12.

In Fig. 4 I have shown a modified form of positioning means in which certain link plates of the chain project, as indicated at 16, to form a groove for the oiling chain. Another manner of guiding this chain would be to provide stationary guides at the bottom of the casing 11.

The oiling chain 12 may be of any convenient form of light chain or flexible belting, as diagrammatically indicated in Figs. 1 and 2.

In some instances, it may be desirable to carry more lubricant to the drive chain than would be afforded by an oiler chain constructed of ordinary twisted links, in which case cupped links, as illustrated in Fig. 5, may be employed.

From the foregoing, it will be seen that I have provided a very simple, inexpensive, and effective oiling device for chain drives which, in short, comprises a light chain running loosely on the outside of a drive chain, which light chain passes through an oil reservoir, carrying oil with it to the top of the drive chain.

I claim:—

1. An oiling device for multiplate drive chains comprising a light chain passing around the drive chain, the sag of the slack run of which is greater than the sag of the slack run of the drive chain, and a reservoir containing lubricant through which the slack portion of the light chain passes.

2. An oiling device for multiplate drive chains comprising endless means passing around the drive chain and a reservoir containing lubricant through which said means passes whereby said means carries lubricant from the reservoir to the chain.

3. In combination, a plurality of sprocket wheels, an endless silent chain passing over said wheels, a casing therefor, and endless cupped means around said silent chain adapted to carry lubricant to the silent chain and means for supplying lubricant to the cups.

4. An oiling device for multiplate drive chains comprising endless means passing around the drive chain and a reservoir containing lubricant through which said means passes, whereby said means carries lubricant from the reservoir to the chain, together with means for preventing displacement of said means.

5. An oiling device for multiplate drive chains comprising endless means passing around the drive chain and a reservoir containing lubricant through which said means passes, whereby said means carries lubricant from the reservoir to the chain, together with means on the chain for preventing displacement of said means.

6. An oiling device for endless drive chains comprising a strand of endless light chain passing around the drive chain, the length of which is somewhat greater than that of the drive chain, and an oil reservoir from which the light chain takes oil and delivers it to the drive chain.

7. An oiling device for multiplate drive chains comprising a light chain passing around the drive chain, the sag of the slack run of which is greater than the sag of the slack run of the drive chain, and a reservoir containing lubricant through which the slack portion of the light chain passes, the links of the light chain being cupped.

8. A silent chain drive including driving sprockets, an endless multiplate chain passing over the sprockets, a casing therefor having a lubricant receiving portion, and a light chain loosely passing around said multiplate chain and adapted to dip into the lubricant in the casing, the level of which is maintained below the lowermost point of the multiplate chain and above the lowermost point of the light chain.

In testimony whereof I have hereunto signed my name.

NORMAN C. BREMER.